United States Patent
Shattah et al.

(10) Patent No.: US 10,547,553 B2
(45) Date of Patent: Jan. 28, 2020

(54) STATEFUL CONNECTION TRACKING

(71) Applicant: MELLANOX TECHNOLOGIES, LTD., Yokneam (IL)

(72) Inventors: Guy Shattah, Tel Aviv (IL); Ron Efraim, Zur Hadasa (IL); Lior Narkis, Petah-Tikva (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 15/996,548

(22) Filed: Jun. 4, 2018

(65) Prior Publication Data

US 2019/0089641 A1     Mar. 21, 2019

Related U.S. Application Data

(63) Continuation-in-part of application No. 15/706,713, filed on Sep. 17, 2017.

(51) Int. Cl.
| | |
|---|---|
| *H04L 29/06* | (2006.01) |
| *H04L 12/851* | (2013.01) |
| *H04L 12/931* | (2013.01) |
| *H04L 12/801* | (2013.01) |

(52) U.S. Cl.
CPC ........ *H04L 47/2441* (2013.01); *H04L 47/193* (2013.01); *H04L 49/70* (2013.01); *H04L 63/0254* (2013.01); *H04L 63/1466* (2013.01); *H04L 63/1458* (2013.01)

(58) Field of Classification Search
CPC ............. H04L 63/0254; H04L 47/2483; H04L 47/2441; H04L 69/22; H04L 43/02
See application file for complete search history.

(56) References Cited

U.S. PATENT DOCUMENTS

| | | |
|---|---|---|
| 7,660,306 B1 | 2/2010 | Eiriksson et al. |
| 2002/0116644 A1* | 8/2002 | Richard ............ H04L 63/02 726/9 |
| 2004/0042458 A1 | 3/2004 | Elzu |
| 2004/0042483 A1 | 3/2004 | Elzur et al. |
| 2006/0274742 A1 | 12/2006 | Pong |
| 2008/0115204 A1 | 5/2008 | Ramsey et al. |

(Continued)

OTHER PUBLICATIONS

Request for Comments 793, "Transmission Control Protocol", DARPA Internet Program, Protocol Specification, 90 pages, Sep. 1981.

(Continued)

*Primary Examiner* — David J Pearson
(74) *Attorney, Agent, or Firm* — Kligler & Associates Patent Attorneys Ltd

(57) ABSTRACT

A mechanism is provided for partial offload of connection tracking from a host processor to a network interface device. Software running in the host processor is used for connection establishment. After a connection has been established the software initializes and transfers flow-control to the network interface device. Thereafter, the network interface device continues transferring packets to the destination, while the software in the host processor monitors the flow. If the connection has been terminated or has expired flow control reverts to the software. Modes of operation are provided for network interface devices with and without a specific connection-tracking module.

12 Claims, 10 Drawing Sheets

(56) References Cited

U.S. PATENT DOCUMENTS

| | | | | |
|---|---|---|---|---|
| 2013/0254766 A1* | 9/2013 | Zuo | ............ | H04L 47/20 |
| | | | | 718/1 |
| 2014/0059216 A1* | 2/2014 | Jerrim | ............ | H04L 67/104 |
| | | | | 709/224 |
| 2016/0036856 A1* | 2/2016 | Liu | ............ | H04L 63/0263 |
| | | | | 726/1 |
| 2016/0050299 A1* | 2/2016 | Huang | ............ | H04L 69/08 |
| | | | | 370/466 |

OTHER PUBLICATIONS

Handley et al., "TCP Congestion Window Validation", Network Working Group, RFC2861, 11 pages, Jun. 2000.
U.S. Appl. No. 15/706,713 office action dated Apr. 26, 2019.
Kaufmann et al., "High Performance Packet Processing with FlexNIC", ASPLOS '16, pp. 1-15, Apr. 2-6, 2016.
U.S. Appl. No. 15/706,713 office action dated Oct. 23, 2019.

* cited by examiner

STATEFUL CONNECTION TRACKING

CROSS-REFERENCE TO RELATED APPLICATIONS

This Application is a Continuation-in-Part of U.S. application Ser. No. 15/706,713, filed Sep. 17, 2017, which is herein incorporated by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates generally to data communications, and specifically to apparatus and methods for filtering data packets received from a network.

2. Description of the Related Art

The meanings of certain acronyms and abbreviations used herein are given in Table 1.

TABLE 1

| Acronyms and Abbreviations | |
|---|---|
| CPU | Central Processing Unit |
| CT | Connection Tracking |
| DDoS | Distributed Denial of Service |
| DMA | Direct Memory Access |
| FTP | File Transmission Protocol |
| IETF | Internet Engineering Task Force |
| IP | Internet Protocol |
| NAT | Network Address Translation |
| NIC | Network Interface Controller |
| OVS | Open V- Switch |
| PCIe | Peripheral Component Interconnect Express |
| QP | Queue Pair |
| RAM | Random Access Memory |
| RDMA | Remote Direct Memory Access |
| RFC | Request For Comments |
| SCTP | Stream Control Transmission Protocol |
| SFW | Stateful Firewall |
| SR-IOV | Single-Root I/O Virtualization |
| TCP | Transmission Control Protocol |
| UDP | User Datagram Protocol |
| VM | Virtual Machine |
| VMM | Virtual Machine Monitor |
| vNIC | Virtual NIC |
| WQE | Work Queue Element |

A network interface controller (NIC) is a device that manages and transfers communications between a host computer (referred to alternatively simply as a "host") and a network, such as a local area network or switch fabric. The NIC directs packets from the network to their destination in the computer, for example by placing the packets in a buffer of a destination application in the computer memory, and directs outgoing packets to the network.

Some NICs are capable of filtering packets received from the network, and can thus perform access control and firewall functions on behalf of the host computer. For example, U.S. Patent Application Publication 2015/0358290 describes a method for stateful packet classification that uses hardware resources for performing stateful connection flow handshaking. To classify an incoming packet from a network, some embodiments perform stateless look-up operations for the incoming packet in hardware and forward the result of the stateless look-up to the software. The software in turn uses the result of the stateless look-up to perform the stateful connection flow handshaking and to determine the result of the stateful packet classification.

SUMMARY OF THE INVENTION

Embodiments of the present invention that are described hereinbelow provide improved network interface devices, embedded switches and built-in flow tables for processing packets received from a network.

Routing policies are sets of rules that define flow of packets from one physical port to another. Routing policies based solely on packet header information are almost obsolete, Mechanisms such as connection tracking enable system administrators and security experts to define more intelligent policies based on a TCP connection state. Connection tracking is used to track changes in TCP connections. Typical use cases are firewalls, in which packets unrelated to the connection are omitted and NAT, when NAT mapping is a result of connection initiation/termination.

Connection tracking hardware limitations in most current network devices prevent creating and destroying a connection tracking context (the state of a connection) in hardware without software involvement. In such devices, the software establishes a TCP connection. After the connection has been established, the software initializes the hardware and transfers flow control. The hardware continues transferring packets to the destination while a driver monitors the flow. If the connection has been terminated by a termination sequence or has expired due to lack of packets during a predefined period, the driver notifies the operating system kernel, which in turn instructs the driver to release hardware resources relating to the connection.

Embodiments of the invention provide several ways to implement connection tracking in a switch or a NIC having an embedded switch and built-in flow tables. In some embodiments, rather than dealing with a dedicated hardware switch, a virtual switch interacts with the embedded switch. The virtual switch is a software implementation of a network switch, which can operate as a soft switch running within a hypervisor. Such a virtual switch enables a physical computing device with multiple ports (physical or virtual) to act as a dedicated switch for any number of virtual machines.

In some embodiments routing policies are implemented in a specialized language using flow tables.

There is provided according to embodiments of the invention a method for communication, which is carried out by receiving over a network in a network interface controller (NIC) incoming data packets destined for one or more local processes running on a host processor that is coupled to the network by the NIC, maintaining a list of active connections established via the NIC between the local processes running on the host processor and corresponding processes on other computers on the network in accordance with a predefined transport protocol, and maintaining context information with respect to a respective state of each of the active connections. The method is further carried out by receiving in the NIC a packet from the network with a header identifying the packet as having been transmitted to one of the local processes in accordance with the predefined transport protocol. The method is further carried out by checking the list, by the NIC, to make a determination that the packet fails to correspond to any of the active connections in the list. The method is further carried out with a connection handling program in the host processor responsively to the determination by establishing a new connection for the packet. Establishing a new connection includes transmitting packet-handling rules for the new connection from the host processor to the NIC. Subsequently arriving packets that correspond to the new connection are processed in accordance with the packet-handling rules in the NIC.

According to one aspect of the method, maintaining context information is performed in hardware that supports connection tracking.

In another aspect of the method the NIC includes an embedded switch having an ordered series of flow tables. The method is further carried out instantiating a new flow table in the series, incorporating the packet-handling rules into the new flow table, and transferring contents of the packet to the new flow table.

Still another aspect of the method is carried out in the NIC using the packet-handling rules of the new flow table to distinguish a new connection from an established connection.

An additional aspect of the method is carried out by performing actions on the packet in the new flow table responsively to a satisfaction of a predetermined criterion.

Another aspect of the method is carried out in the NIC using the packet-handling rules of the new flow table to identify a connection termination request and transferring, responsively to the connection termination request, flow control of the packet to a software process executing in the host processor.

According to a further aspect of the method, instantiating a new flow table includes inserting the new flow table between two contiguous flow tables in the series.

According to yet another aspect of the method, the flow tables in the series comprise respective ordered numerical identifiers, and wherein instantiating a new flow table includes doubling the numerical identifiers, thereafter inserting the new flow table, and assigning a new numerical identifier to the new flow table that is in a range between the doubled numerical identifiers of the two contiguous flow tables.

There is further provided according to embodiments of the invention network interface apparatus, including a host interface for connection to a host processor, a network interface, which is configured to receive over a network incoming data packets destined for one or more local processes running on the host processor, and packet processing circuitry, including hardware logic, which is coupled between the network interface and the host interface and is configured to access a list of active connections established between the local processes running on the host processor and corresponding processes on other computers on the network in accordance with a predefined transport protocol. The packet processing circuitry is configured for: upon receiving a packet from the network having a header identifying the packet as having been transmitted to a local process in accordance with the predefined transport protocol; making a determination that the packet fails to correspond to any of the active connections in the list; and responsively to the determination with a connection handling program in the host processor establishing a new connection for the packet. Establishing a new connection includes transmitting packet-handling rules for the new connection from the host processor to the packet processing circuitry, updating the list of active connections. The packet processing circuitry is further configured for processing subsequently arriving packets that correspond to the new connection in accordance with the packet-handling rules.

According to yet another aspect of the apparatus, the packet processing circuitry supports connection tracking, and is configured for maintaining context information with respect to a respective state of each of the active connections.

According to a further aspect of the apparatus, the packet processing circuitry includes an embedded switch having an ordered series of flow tables, and is further configured for instantiating a new flow table in the series, incorporating the packet-handling rules into the new flow table, and accepting contents of the packet in the new flow table.

According to one aspect of the apparatus, the packet processing circuitry is configured for using the packet-handling rules of the new flow table to distinguish a new connection from an established connection.

According to another aspect of the apparatus, the packet processing circuitry is configured for performing actions on the packet in the new flow table responsively to a satisfaction of a predetermined criterion.

According to an additional aspect of the apparatus, the packet processing circuitry is further configured for using the packet-handling rules of the new flow table to identify a connection termination request.

According to still another aspect of the apparatus, the packet processing circuitry is further configured for transferring, responsively to the connection termination request, flow control of the packet to a software process executing in the host processor.

According to still another aspect of the apparatus, instantiating a new flow table includes inserting the new flow table between two contiguous flow tables in the series.

BRIEF DESCRIPTION OF THE SEVERAL VIEWS OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION OF THE INVENTION

Figure 1:
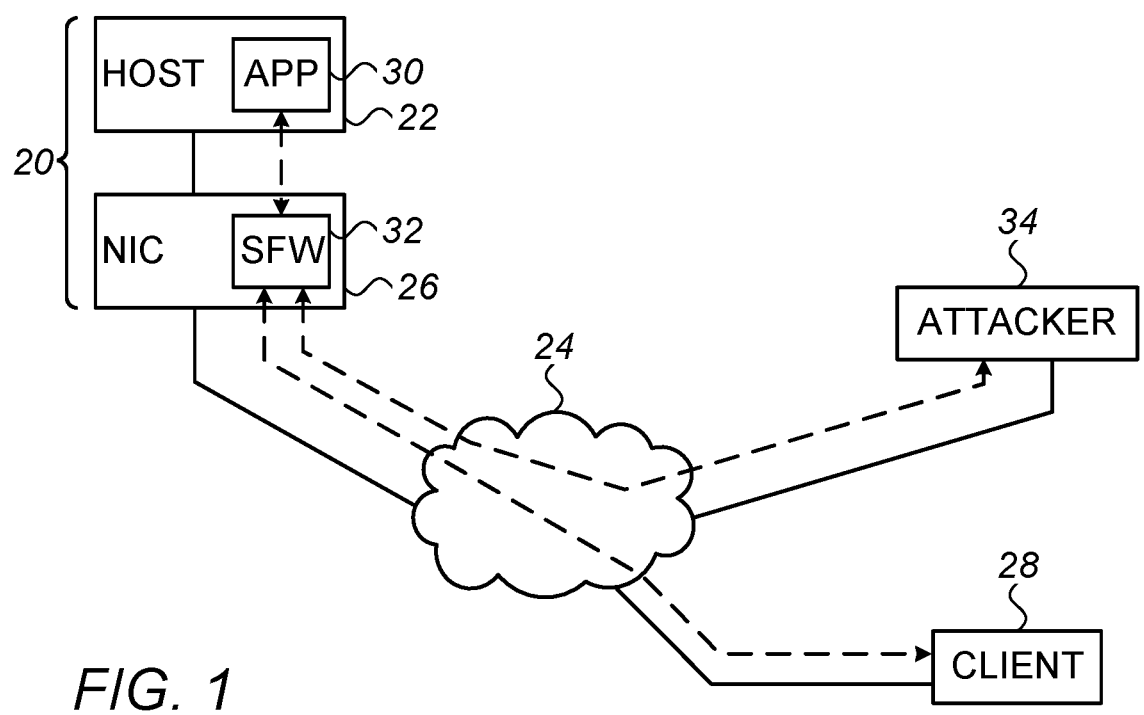
FIG. 1 is a block diagram that schematically illustrates the operation of a server with a NIC that performs stateful firewall functions, in accordance with an embodiment of the invention.

In the following description, numerous specific details are set forth in order to provide a thorough understanding of the various principles of the present invention. It will be apparent to one skilled in the art, however, that not all these details are necessarily always needed for practicing the present invention. In this instance, well-known circuits, control logic, and the details of computer program instructions for conventional algorithms and processes have not been shown in detail in order not to obscure the general concepts unnecessarily.

Documents incorporated by reference herein are to be considered an integral part of the application except that, to the extent that any terms are defined in these incorporated documents in a manner that conflicts with definitions made explicitly or implicitly in the present specification, only the definitions in the present specification should be considered.
Definitions.

A "flow table" is an object that describes a stop or station in the flow of a packet from its incoming port to its destination, comprising multiple match-and-action couples.

In a match-and-action couple, a "match" is a test for criteria concerning the packet. An "action" is a set of decisions regarding the disposition of the packet, e.g., drop packet, send to another flow table, send to output port.

"Supported hardware" and "hardware supporting connection tracking" refer to hardware that is capable of stateful connection monitoring.
Overview.

Filtering of incoming packets received from a network is crucial in maintaining security against attacks. Stateless filtering—in which packets are simply checked against certain valid and invalid patterns of header and payload content—is useful as a first line of defense, but has been found to provide insufficient protection against more sophisticated types of attacks, such as distributed denial of service (DDoS) attacks and probes used by persistent attackers. Attacks of these sorts take advantage of connections made using stateful transport protocols, such as the Transmission Control Protocol (TCP). Stateful filtering, based on monitoring the states of connections and rejecting packets that do not conform to the state parameters expected of legitimate traffic, is therefore an important tool in mitigating possible damage due to such attacks.

Stateful connection monitoring and filtering involve complex decision logic and are therefore generally carried out in software, for example using the Connection Tracking software module of the Linux operating system kernel. In a server handling large volumes of TCP or other connection-oriented traffic, this sort of connection tracking imposes a heavy burden on the central processing unit (CPU), which must check and update context information for every packet that is received or transmitted over many different connections concurrently. This processing load can also have a serious negative impact on message throughput and latency.

Embodiments of the present invention that are described herein address these limitations by offloading at least a portion of these connection tracking and filtering functions to hardware logic in the NIC that is used to connect the host computer to a network. Because of the complexities of connection-oriented transport protocols, such as TCP, it is generally not practical to offload all the control flows of connection tracking to hardware logic. The large majority of connection-oriented traffic, however, is made up of legitimate message flows over existing connections. Therefore, in the disclosed embodiments, connection set-up and termination are still carried out in software, typically by a privileged process in or connected with the kernel of the host operating system. At the same time, hardware logic in the NIC performs stateful filtering and context updates for existing connections, while passing exceptions to the software for handling.

In the embodiments that are described hereinbelow, network interface apparatus, such as a NIC, comprises a host interface for connection to a host processor and a network interface, which receives incoming data packets from a network that are destined for local processes running on the host processor. (The local process to which an incoming packet is destined, as indicated by the address information in the packet header, is also referred to herein as the destination process.) In order to handle the incoming packets that belong to a certain connection-oriented transport protocol (or protocols), such as TCP, hardware logic in the NIC accesses a list of active connections that have been established between the local processes running on the host processor and corresponding processes on other computers in accordance with the protocol. The hardware logic also maintains context information with respect to the respective state of each of the active connections, and updates this context information based on the incoming and outgoing packets handled by the NIC.

Upon receiving a packet from the network having a header identifying the packet as having been transmitted to a local process in accordance with the protocol that is being monitored, the hardware logic checks the list of active connections to find the connection to which the packet belongs. Upon finding the connection, in a NIC with no connection tracking support the hardware either forwards the packet to its destination or marks that packet as 'tracked+established', and then forwards it.

In a NIC with connection tracking support the hardware logic verifies that the packet conforms to the state indicated by the context information for this connection. If it does conform, the hardware logic updates the context information while passing the packet to the local process. Packets can be passed in this manner to and from non-privileged, user-level application software, including applications running on virtual machines running on the host computer, without involvement by the host operating system kernel or other privileged software. In a NIC with connection tracking support the hardware may also monitor outgoing packets on the active connections in order to update the context information as required.

Typically, the hardware logic in the NIC passes the packet to the target local process indicated by the packet header only when the packet conforms as expected to the state of an existing connection on the list. When the connection is not found on the list, or the packet does not conform to the state of the connection to which the packet belongs, the hardware logic applies other processing rules. For example, the hardware logic can pass the packet to a privileged software process running on the host processor for the purpose of possibly establishing a new connection or tearing down an existing connection. When such a new connection is established by software, it is added to the list. If a NIC with supporting hardware is found then updated context information is maintained by the hardware logic for use in handling subsequent packets. In appropriate cases, the hardware logic may identify the packet as invalid, and discard the packet or pass it to a privileged software process for special handling.

For the sake of concreteness and clarity or illustration, the embodiments that are described herein relate specifically to filtering of TCP traffic. The techniques described herein are similarly applicable, mutatis mutandis, to other connection-oriented transport protocols, such as the Stream Control Transmission Protocol (SCTP) and the File Transfer Protocol (FTP), as well as to connection tracking with respect to stateless protocols, such as the User Datagram Protocol (UDP). Furthermore, the principles of hardware-based connection tracking that are described herein may also be applied in stateful packet handling for other purposes, such as offload to a NIC of functions associated with network address translation (NAT). All such alternative implementations and applications are considered to be within the scope of the present invention.

First Embodiment

FIG. 1 is a block diagram that schematically illustrates the operation of a server 20 with a NIC 26 that functions as a stateful firewall 32 (SFW), in accordance with an embodiment of the invention. Server 20 comprises a host complex 22, which is connected by NIC 26 to a packet data network 24, such as an Internet Protocol (IP) network. Processes running on other computers on network 24, such as a client process 28, interact with processes running on server 20, such as an application 30, by opening and using TCP connections through the network. The principles and requirements of TCP in this regard are described, for example, in Request for Comments (RFC) 793 of the Internet Engineering Task Force (IETF).

Stateful firewall 32 comprises hardware logic, as described further hereinbelow, which is integrated as a part of the packet processing logic of NIC 26 and is configured to track TCP connections that are in use by host complex 22, such as the connection between client process 28 and application 30 shown in FIG. 1. Once this TCP connection has been set up, stateful firewall 32 tracks and updates the state of the connection based on the packets that are transmitted and received via the connection over network 24. On this basis, NIC 26 is able to filter incoming TCP packets from client process 28, to verify that they conform to the expected state, and, when the NIC provides connection tracking support, to update the context information while passing the packet to application 30.

Stateful firewall 32 in NIC 26 will similarly filter TCP packets transmitted to server 20 by malicious entities, such as an attacker 34. The attacker may, for example, attempt to bombard server 20 with requests to open TCP connections, as in a DDoS attack, or may attempt to send malformed or otherwise non-standard TCP packets over a connection to server 20 in order to exploit a software vulnerability of host complex 22. In such cases, stateful firewall 32 will encounter incoming TCP packets that do not conform to the expected state of an existing connection. NIC 26 will not pass such packets to application 30 (or to other non-privileged processes), but will rather queue them for handling by a privileged software process running on host complex 22. In the meanwhile, because the functions of stateful firewall 32 are performed by hardware logic, NIC 26 will continue passing legitimate incoming TCP packets that have been received on existing connections to application 30 without significant delay or reduction of bandwidth, even under attack conditions.

The functions performed by firewall 32, as described herein, are "stateful" in the sense that their implementation requires NIC 26 to track and make use of the respective states of the packet flows involved. Thus, depending on the states of the various connections that firewall 32 monitors, if NIC 26 has connection tracking support, then it may find a given set of header parameters in a certain packet to be legitimate at a given time, and thus will pass the packet through to its destination process. Moreover, if NIC 26 has connection tracking support it may reject a later packet with the same set of parameters because it does not conform to the current connection state. In addition to the novel stateful, hardware-based filtering functions that are described herein, NIC 26 may also carry out stateless filtering functions that are known in the art, such as application of predefined access control rules.

Figure 2:
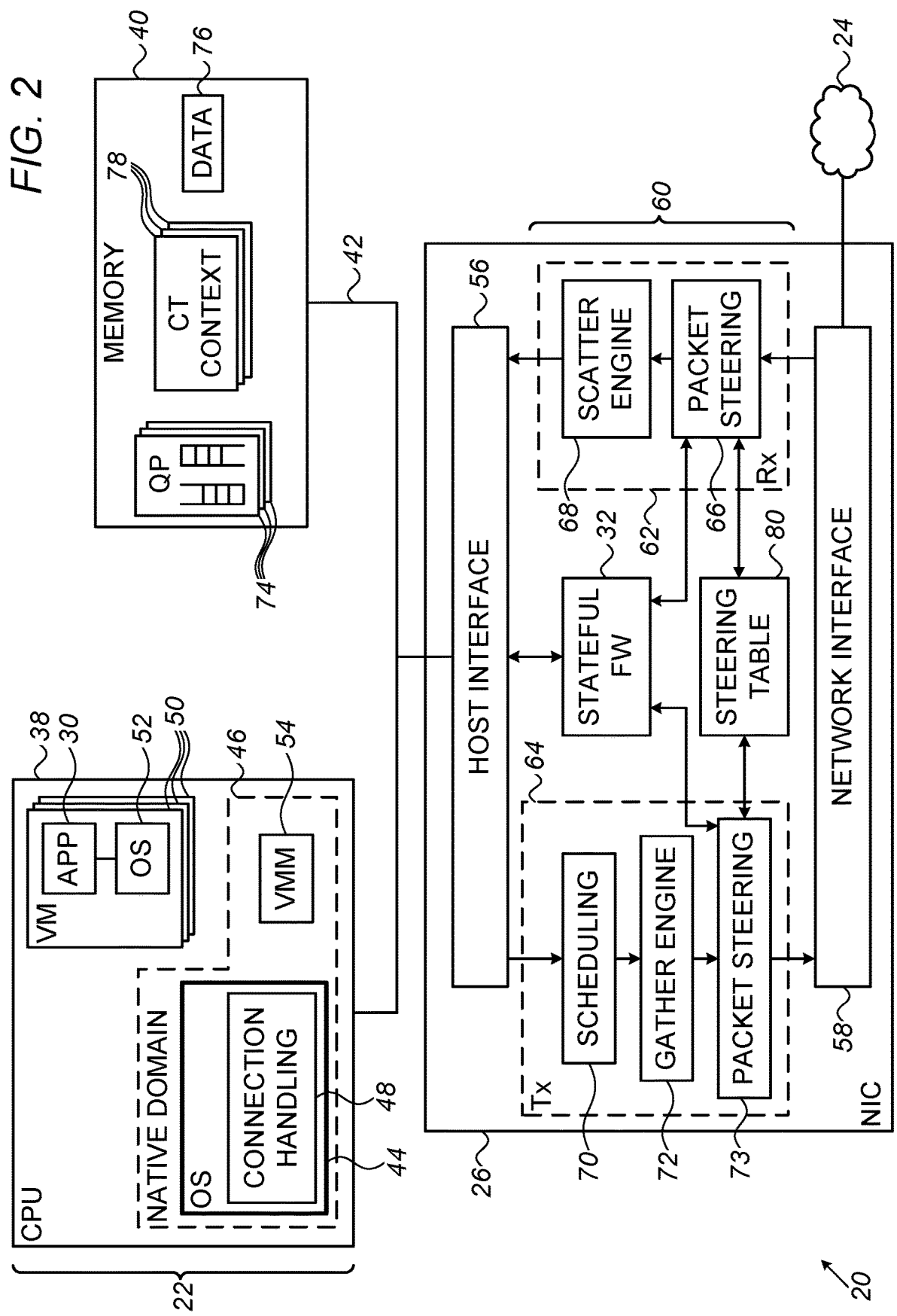
FIG. 2 is a block diagram showing details of a server and a NIC implementing a stateful firewall, in accordance with an embodiment of the invention.

FIG. 2 is a block diagram showing details of server 20, and specifically of NIC 26 and stateful firewall 32, in accordance with an embodiment of the invention. For the sake of brevity, only those aspects of host complex 22 and NIC 26 that are necessary to an understanding of the present embodiments are shown in the figure and described hereinbelow. Other features of the construction and operation of server 20, as well as the integration of these features with those described herein, will be apparent to those skilled in the art. Typically, NIC 26 comprises one or more integrated circuit chips, in which the functional components that are shown in FIG. 2, along with other, standard elements, are implemented in hardware logic, which may be hard-wired or programmable. Additionally or alternatively, certain elements of NIC 26 may be implemented in software or firmware running on an embedded processor.

Host complex 22 comprises a host processor in the form of a central processing unit (CPU) 38, with a memory 40, typically comprising random-access memory (RAM). NIC 26 is connected to CPU 38 and memory 40 via a bus 42, such as a Peripheral Component Interconnect Express® (PCIe®) bus, as is known in the art. In the pictured example, server 20 supports a virtual machine environment, in which one or more virtual machines 50 run on CPU 38. The software running on CPU 38, including both operating system and application programs, may be downloaded to server 20 in electronic form, over a network for example. Additionally or alternatively, the software may be stored on tangible, non-transitory computer-readable media, such as optical, magnetic or electronic memory media, which may be embodied in memory 40.

CPU 38 operates a native domain 46, with a host operating system 44, which can support host user applications and other native processes. These processes include a privileged TCP connection handling software module 48, which may be a part of the kernel of operating system 44. Software module 48 is "privileged" in that it has access to and is able to make changes in the state context of TCP connections established over network 24. This context includes parameters that are used in setting up and maintaining TCP connections, such as the current state, packet sequence numbers, and window values. Other privileged software modules running on CPU 38 include a virtual machine monitor (VMM) 54, also referred to as a "hypervisor."

In addition to these native domain functions, CPU 38 concurrently runs one or more virtual machines 50, as noted above, each with its own guest operating system 52 and guest user applications, such as application 30. VMM 54 in native domain 46 interacts with the kernels of guest operating systems 52 of virtual machines 50 in a manner that emulates the host processor and allows the virtual machines to share the resources of CPU 38. A wide range of virtual machine software of this sort is available commercially, and further description is beyond the scope of the present disclosure.

NIC 26 comprises a host interface 56, for connection to CPU 38 and memory 40 via bus 42, and a network interface 58, comprising one or more ports connected to network 24. Network interface 58 transmits and receives data packets in multiple packet flows from and to processes running on CPU 38. The packets are processed by packet processing circuitry 60, which is coupled between host interface 56 and network interface 58 and comprises a receive (Rx) pipe 62, for processing incoming data packets received from network 24, and a transmit (Tx) pipe 64, for processing outgoing packets for transmission to the network.

In received pipe 62, packet steering logic 66 identifies, for each incoming packet, the flow to which the packet belongs and the local process running on CPU 38 to which the packet is to be delivered. In order to make this decision, steering logic 66 extracts a flow identifier from the packet, typically based on one or more packet header fields, such as the IP 5-tuple (source and destination addresses, source and destination ports, and protocol identifier) and/or a transport-layer value. Steering logic 66 looks up the flow in a steering table 80, which also indicates whether the packet is to be referred to stateful firewall 32 before forwarding to the destination process. If so, firewall 32 filters the packet and then may indicate to steering logic 66 the destination process to which the packet should be directed. For example, firewall 32 may indicate to steering logic 66 whether to forward the packet to application 30 or to connection handling software module 48. Steering logic 66 then directs a scatter engine 68 in receive pipe 62 to write the packet to an appropriate data buffer 76 in memory 40, typically by direct memory access (DMA) over bus 42. Receive pipe 62 notifies the destination process that the packet is available for reading, for example by placing a completion report in a completion queue in memory 40.

In transmit pipe 64, scheduling logic 70 arbitrates among packet transmission requests submitted by processes running on CPU 38. When scheduling logic 70 has scheduled a packet for transmission, a gather engine 72 reads the packet data from memory 40 and passes the packet to packet steering logic 73, which passes information to stateful firewall 32 regarding outgoing TCP packets that have been queued for transmission. This information enables firewall 32 to update the state context of existing TCP connections and to return corresponding state information to steering logic 73. On this basis, steering logic 73 makes the appropriate steering decision, for example to pass the packet to network interface 58 for transmission over network 24.

Processes running on CPU 38, such as user application 30 and connection handling software module 48, interact with NIC 26 by manipulating a transport service instance, known as a "queue pair" (QP) 74. To send and receive messages over network 24 using NIC 26, processes running on CPU 38 submit work items, called work queue elements (WQEs), to the appropriate queues for execution by the NIC. In a model having a virtual interface, for example single-root I/O virtualization (SR-IOV), each virtual machine 50 interacts with NIC 26 in this manner as though the NIC was dedicated to that virtual machine, linking the virtual machine to other machines (virtual and/or physical) on network 24. NIC 26 thus appears to each virtual machine 50 to be a dedicated I/O device, or vNIC, for use by that virtual machine in communicating directly over the network. This configuration minimizes the burden of communication on VMM 54 and on host operating system 44.

When connection handling software module 48 establishes a new TCP connection over network 24, on hardware supporting connection tracking it may open a connection tracking (CT) context 78 in memory 40. With any hardware the software module 48 also notifies packet steering logic 66 and stateful firewall 32 of the connection. On hardware supporting connection tracking portions of context 78 may also be cached in a dedicated memory (not shown) in NIC 26 for rapid access by firewall 32. On hardware supporting connection tracking context 78 contains information to be used and updated by firewall 32 in connection tracking and packet filtering, as well as by connection handling software module 48 in handling exceptions detected by firewall 32. When a connection is terminated by the participating processes, on hardware supporting connection tracking software module 48 typically deletes the corresponding context from memory 40. On any hardware the software module 48 notifies packet steering logic.

On hardware supporting connection tracking the information held in CT context 78 for each TCP connection can include, for example:

Header fields (such as source and destination addresses and ports) of incoming and outgoing data packets on the connection.

Connection state (for example, TCP SYN packet sent or received, ACK packet sent or received, FIN packet sent or received, or connection reset in progress).

TCP data sequence number (SN) and length of last TCP packet sent or received and corresponding TCP acknowledgment.

Acknowledgment (ACK) sequence number. (References to checking of TCP sequence numbers in the description that follows and in the claims include, as appropriate, either or both of the data and acknowledgment sequence numbers.)

Current TCP window size information.

Connection performance data, such as the number and status of packet retransmissions.

Control parameters, for example setting thresholds for protocol faults (such as window tracking deviations) at which firewall 32 should block packet reception and report an exception, and types of exceptions that the firewall should report to software.

The above-noted context parameters are listed by way of example, and details and variations on the above will be apparent to those skilled in the art after reading the present description.

Figure 3:
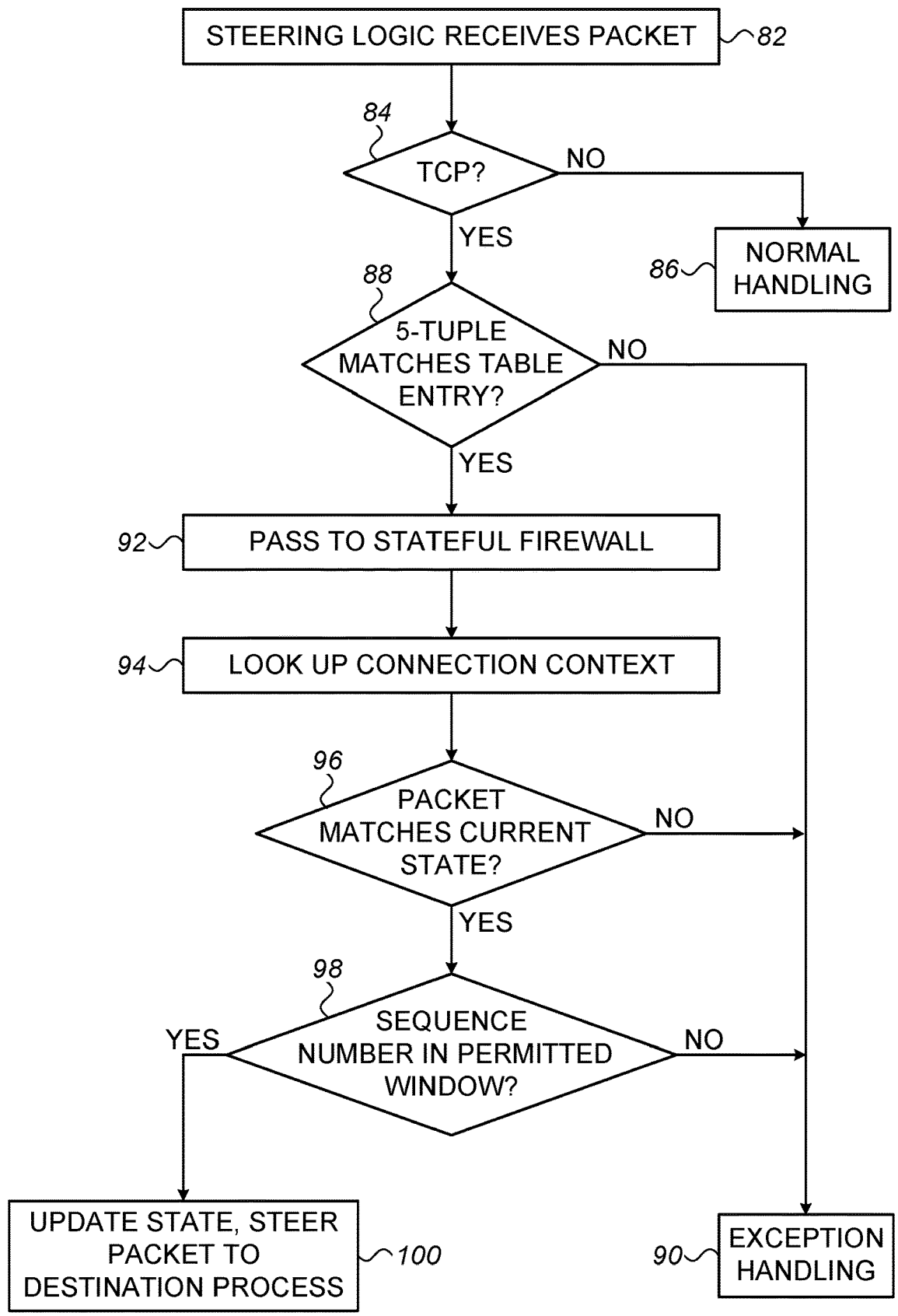
FIG. 3 is a flow chart that schematically illustrates a method for handling packets received from a network in a NIC, in accordance with an embodiment of the invention.

FIG. 3 is a flow chart that schematically illustrates a method for handling packets received from a network in NIC 26, in accordance with an embodiment of the invention. FIG. 3 is applicable to hardware supporting connection tracking and also to hardware that does not connection tracking. The latter requires supplementation by software. The method is initiated by packet steering logic 66 upon receiving an incoming packet from network 24, at a packet input step 82. Steering logic 66 checks the protocol field in the packet header in order to determine whether it is a TCP packet, at a protocol detection step 84. If not, processing of the packet by NIC 26 proceeds in the usual stateless fashion, at a normal handling step 86. This step may include packet filtering by firewall 32, but these stateless modes of filtering are outside the scope of the present description.

If the protocol field identifies the packet as a TCP packet at step 84, packet steering logic 66 checks the packet header against the list of existing TCP connections in steering table 80, at a connection checking step 88. For this purpose, packet steering logic 66 can check the IP 5-tuple against the entries in table 80, for example using a hash-based lookup over the 5-tuple fields.

If the packet does not match any of the connections listed in table 80, steering logic 66 passes the packet to a privileged software process running on CPU 38, such as connection handling software module 48, at an exception handling step 90. For this purpose, steering logic 66 can use a QP 74 (FIG. 2) that is dedicated to the privileged software process. Specifically, steering logic 66 reads a WQE from the receive queue of the QP and instructs scatter engine 68 to write the packet to data buffer 76 indicated by the WQE.

The action taken at step 90 by connection handling software module 48 depends upon the type of exception that has been encountered, and NIC 26 may signal different exception types to indicate to connection handling software module 48 what sort of action is required. One exception type could be, for example, a TCP SYN packet received from network 24, such as a TCP SYN packet sent by client process 28 (FIG. 1) in order to initiate a communication session with application 30 on server 20. In this case, connection handling software module 48 will establish a new connection in response to the packet, and will add the new connection to the list in steering table 80. On hardware supporting connection tracking connection handling module also opens a new CT context 78 in memory 40 for use by the hardware logic in handling subsequent packets received from client process 28 on the new connection.

Figure 4:
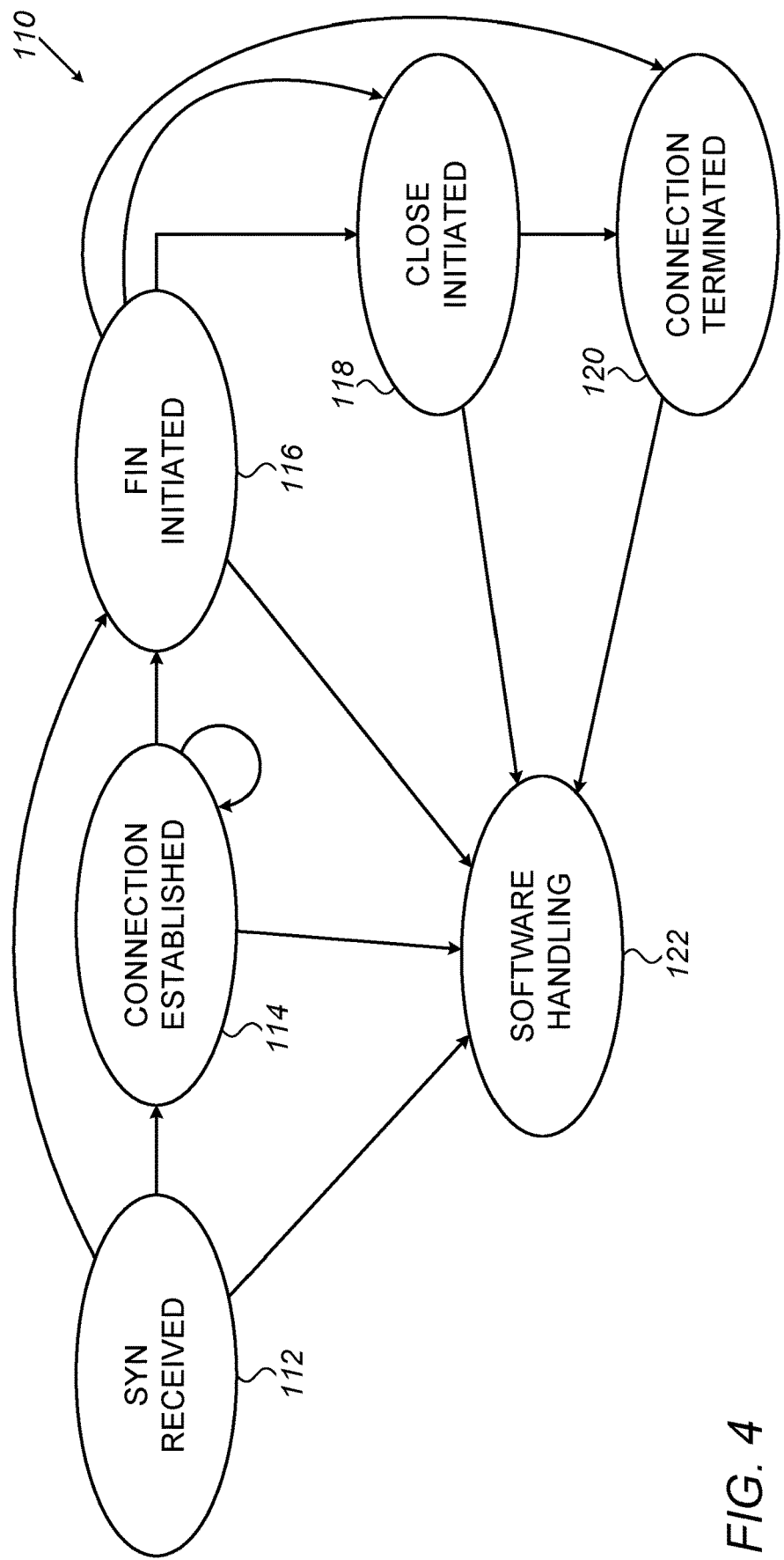
FIG. 4 is a state diagram that schematically illustrates a method for connection tracking by a NIC, in accordance with an embodiment of the invention.

When packet steering logic 66 finds at step 88 that the header of the current packet does match an entry listed in steering table 80, it passes the packet to stateful firewall 32, at a firewall invocation step 92. On hardware supporting connection tracking stateful firewall 32 looks up the appropriate CT context 78 for the packet, either in memory 40 or in an on-board cache, at a context lookup step 96. The stateful firewall then checks whether the packet conforms to the current state of the connection, at a state checking step 96. A state machine model that can be used for this purpose is shown in FIG. 4.

When the packet does not conform to the current state of the connection to which the packet belongs, stateful firewall 32 marks the packet as invalid, and passes the packet to connection handling software module 48 (or to another privileged software process that is designated for the purpose), at exception handling step 90. For security reasons, such invalid packets are not passed to the purported destination process of the connection (such as application 30), and their processing in software may be subject to measures intended to detect and mitigate attacks on server 20. In addition, stateful firewall 32 may also pass packets used in setting up and tearing down TCP connections (as opposed to packets carrying messages over an existing connection) to connection handling software module 48 at this step.

When stateful firewall 32 finds at step 96 that the current state of the packet is valid and is not associated with connection set-up or tear-down, On hardware supporting connection tracking it checks the TCP sequence number against the current TCP window parameters held for this connection in CT context 78, at a window checking step 98. Specifically, stateful firewall 32 checks that the sequence number of the packet falls within the TCP connection window, in accordance with standard TCP requirements. If not, stateful firewall 32 again treats the packet as invalid and passes it on for handling by privileged software at step 90.

Only when a TCP packet has passed all of the above tests does stateful firewall 32 return the packet to steering logic 66 with clearance to pass the packet to the destination process, such as application 30, at a packet delivery step 100. On hardware supporting connection tracking stateful firewall 32 also updates the relevant state parameters in CT context 78, including an update of the TCP connection window based on the sequence number of the packet. In a virtualized environment offering virtual interface functionality, such as that shown in FIG. 2, steering logic 66 can instruct scatter engine 68 to pass the packet directly to application 30 running on virtual machine 50, while bypassing VMM 54.

FIG. 4 is a state diagram that schematically illustrates a state machine model 110 used by stateful firewall 32 in TCP connection tracking, in accordance with an embodiment of the invention. Transitions among the states depend on the type of the latest TCP packet received by the stateful firewall (for example, SYN, ACK, SYNACK, FIN, RST, or none) and the direction of the packet (from the connection originator to the target, or in reply from the target to the originator). Stateful firewall 32 updates the state of model 110 at each pass through step 100 (FIG. 3) depending upon the current state and the packet type and direction.

Model 110 includes the following TCP connection states:

A SYN received state 112, in which connection set-up has been initiated in response to an incoming or outgoing TCP SYN packet.

A connection established state 114, following acknowledgment of the TCP SYN packet. The connection remains in this state as long as proper message exchange is going on in the expected manner over the established connection.

A FIN received state 116, in which connection termination has been initiated in response to an incoming or outgoing TCP FIN packet.

A closure waiting state 118, following acknowledgment of the TCP FIN packet.

A connection termination state 120, when the termination handshake has been completed.

In all other cases—for initial connection set-up and final tear-down, connection reset (RST), and when a packet has been received that does not conform to the expected state transitions listed above—stateful firewall 32 passes the connection to a software handling state 122.

Second Embodiment

In the following embodiments, a typical scenario comprises a single host machine (hypervisor) running multiple virtual machines (VMs). Rather than dealing with a dedicated hardware switch/router, the embodiments involve a virtual switch (v-switch), such as Open V-Switch™ and its interaction with an embedded hardware switch in a NIC, such as the SN2000 Series 100 GbE Switch System, available from Mellanox. The principles of the invention are also applicable, mutatis mutandis, to non-virtualized environments. Thus, although portions of the devices shown in the following drawing figures herein are shown as comprising a number of separate functional blocks, these blocks are not necessarily separate physical entities, but rather may represent, for example, different computing tasks or data objects stored in a memory that is accessible to a processor. These tasks may be carried out in software running on a single processor, or on multiple processors. The software may be provided to the processor or processors on tangible non-transitory media, such as CD-ROM or non-volatile memory.

Figure 5:
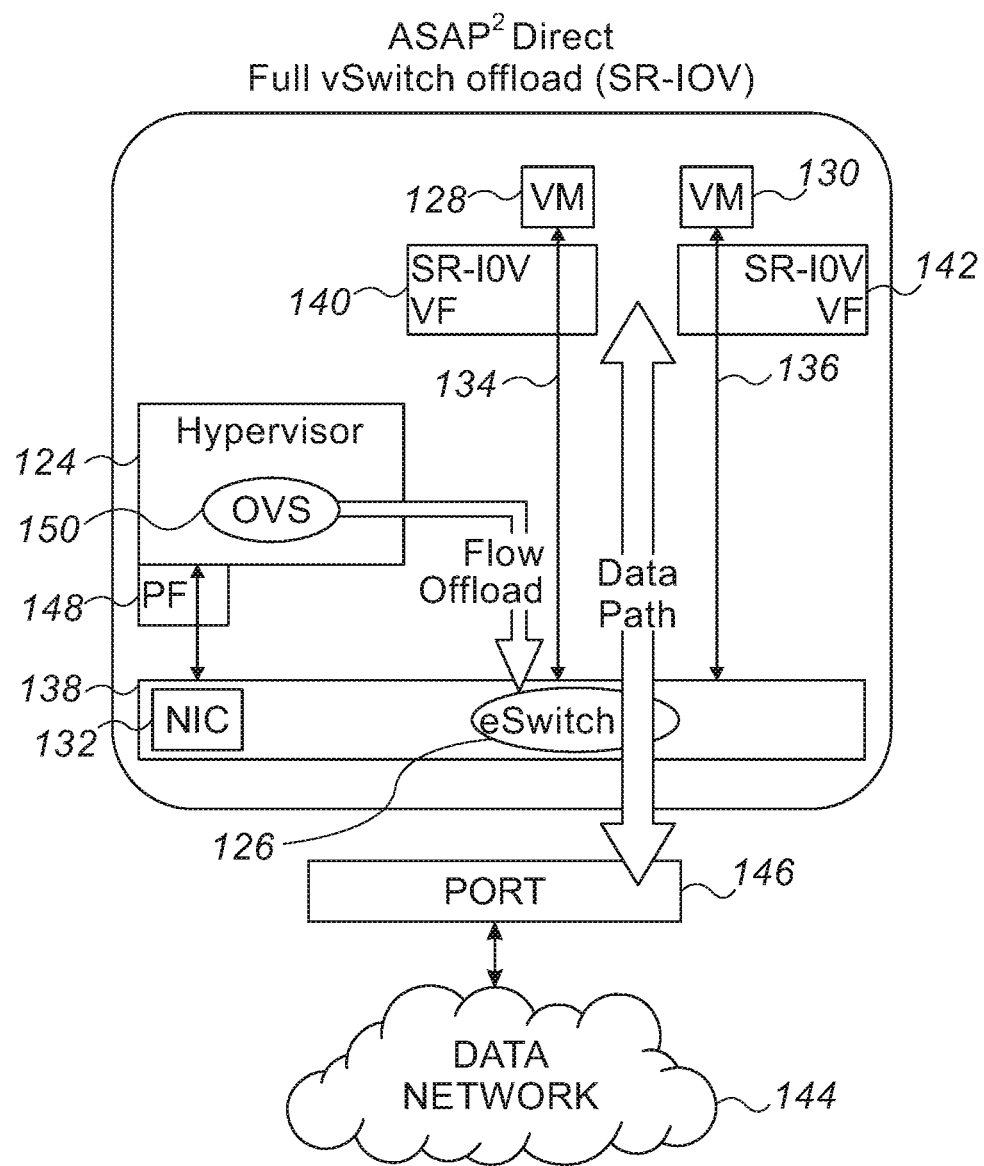
FIG. 5 is a block diagram of an embedded switch operated using single-root I/O virtualization according to an embodiment of the invention.

As shown in FIG. 5, which is a block diagram of an e-switch operated using a virtual interface, such as Single-Root I/O Virtualization (SR-IOV). Hypervisor 124 is linked with a physical embedded switch, eSwitch 126. Multiple virtual machines (VMs), of which virtual machines 128, 130 are shown have an actual NIC 132 installed on respective PCI buses 134, 136. The NIC 132 is implemented in a network adapter 138, such as the ConnectX-4 EN network adapter, available from Mellanox. The network adapter 138 supports Remote Direct Memory Access (RDMA) over Ethernet, as well as Ethernet stateless offload engines.

A physical NIC has three different interfaces: One interface is the physical interface with the host machine; the second interface is a virtual interface (also known as VF—Virtual function); and the third interface is a physical port.

The virtual machines 128, 130 have separate virtual functions 140, 142. An external data network 144 is connected to a physical port 146.

Hypervisor 124 communicates with the NIC 132 via physical interface 148 (physical function PF). Hypervisor 124 runs a virtual switch application 150, such as Open V-Switch (OVS). The virtual switch application 150 implements various routing rules, such as the well-known Open-Flow standard. Some of the routing rules may include connection tracking.

Figure 6:
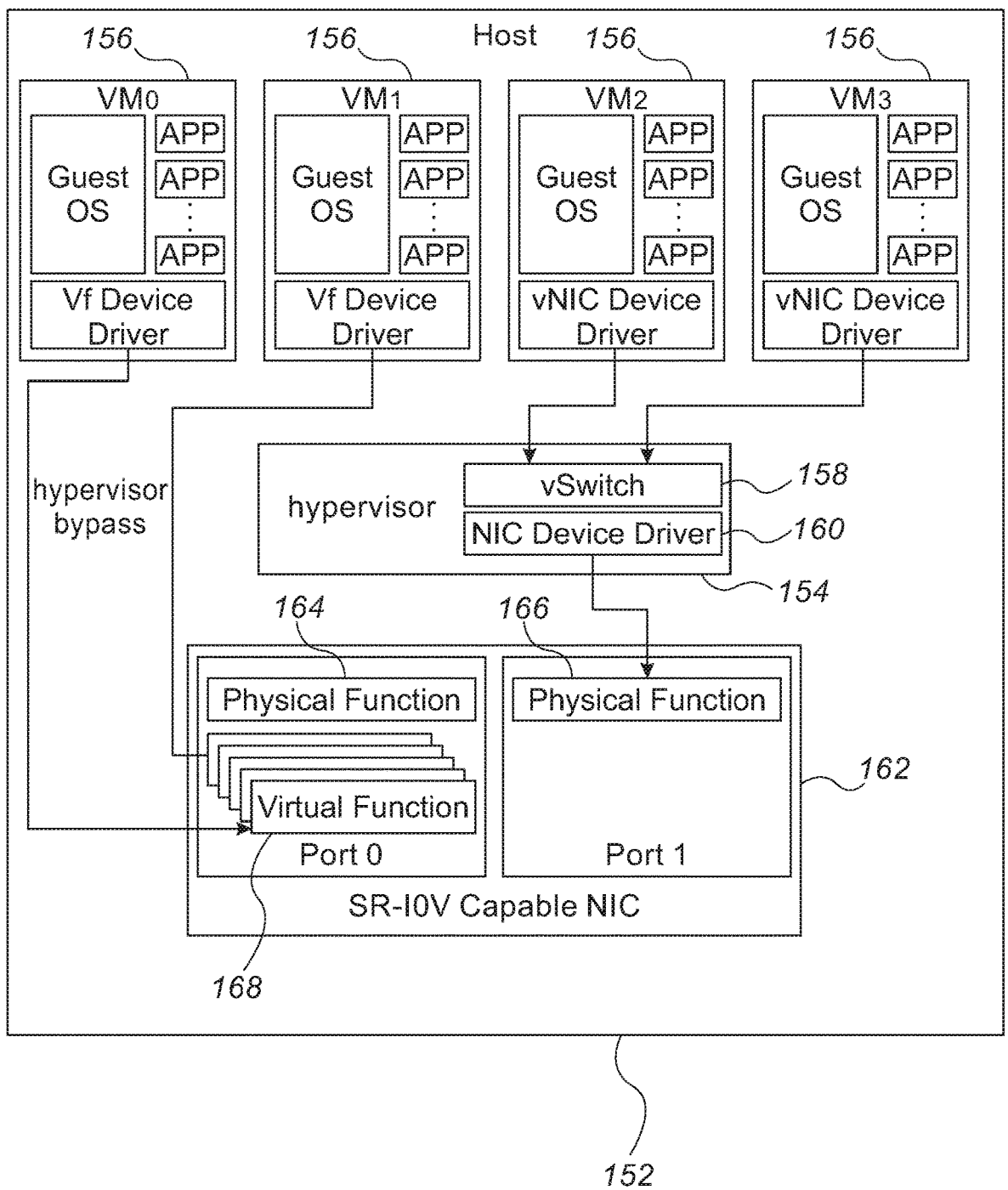
FIG. 6 is a detailed block diagram of a host in which a hypervisor runs multiple virtual machines according to an embodiment of the invention.

FIG. 6 is a more detailed block diagram of a host 152 in which a hypervisor 154 runs multiple virtual machines 156. The host 152 incorporates a virtual switch 158 and a NIC device driver 160. The host 152 includes a physical NIC 162, which constitutes physical functions 164, 166 from the perspective of the hypervisor 154 and virtual machines 156. Physical function 164 incorporates multiple virtual functions 168.

Offloading Connection Tracking.

Due to the lack of complete connection tracking capabilities in the current generation of hardware the connection states are maintained in software. Nevertheless embodiments of the invention enable the current hardware to simulate at least part of the functionality of connection tracking. For example, the forwarding capabilities of the hardware can be used to transfer packets without a TCP congestion window validation, as defined in RFC 2861 of the Network Working Group.

Software is used for connection establishment and termination of packet flows, while the hardware is used for a fast path, i.e., transfer of flows of packets within an existing connection. A flow may be identified by a 5-tuple (source, destination IP addresses, source and destination layer ports and layer 4 protocol).

Current hardware capabilities allow us to distinguish or identify:

(1) a new connection (a packet containing an unknown 5-tuple);
(2) established connections (a packet containing a known 5-tuple and ACK flag);
(3) a connection about to terminate (a packet containing either a FIN or a RST flag); and
(4) an invalid packet—this capability is completely available only on hardware with connection tracking support. NICs without connection tracking support may only detect some of the invalid packets. In some applications even invalid packets may be sent as part of an established connection.

Connection tracking in hardware is implemented in embodiments of the invention by including an intermediate flow table between two existing flow tables A and B. The intermediate flow table is used to distinguish between established connections and the other above-noted possibilities. Upon its creation, an intermediate flow table is initialized with a single default rule: forward all packets to software for processing as described below. This rule distinguishes newly identified connections from established connections.

New Connections.

Figure 7:
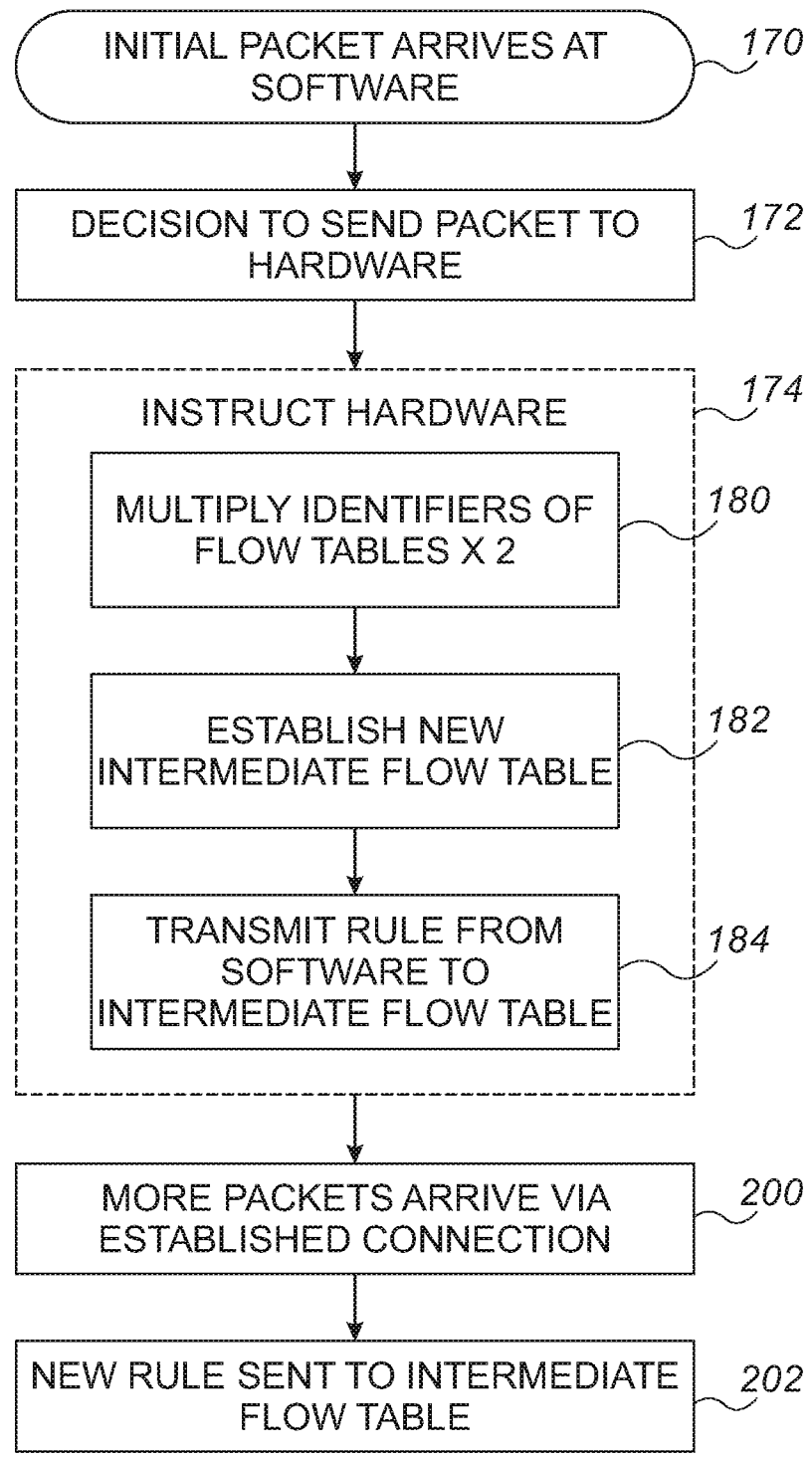
FIG. 7 is a flow chart of a method of processing the first new connection of a session in accordance with an embodiment of the invention.

FIG. 7 is a flow chart of a method of processing the first new connection of a session in accordance with an embodiment of the invention. At initial step 170 an initial packet arrives at a software layer in the host, e.g., connection handling software module 48 (FIG. 1), which makes a decision to offload the packet to hardware in step 172, because its flow identification (e.g., using a 5-tuple) is yet unknown.

Figure 8:
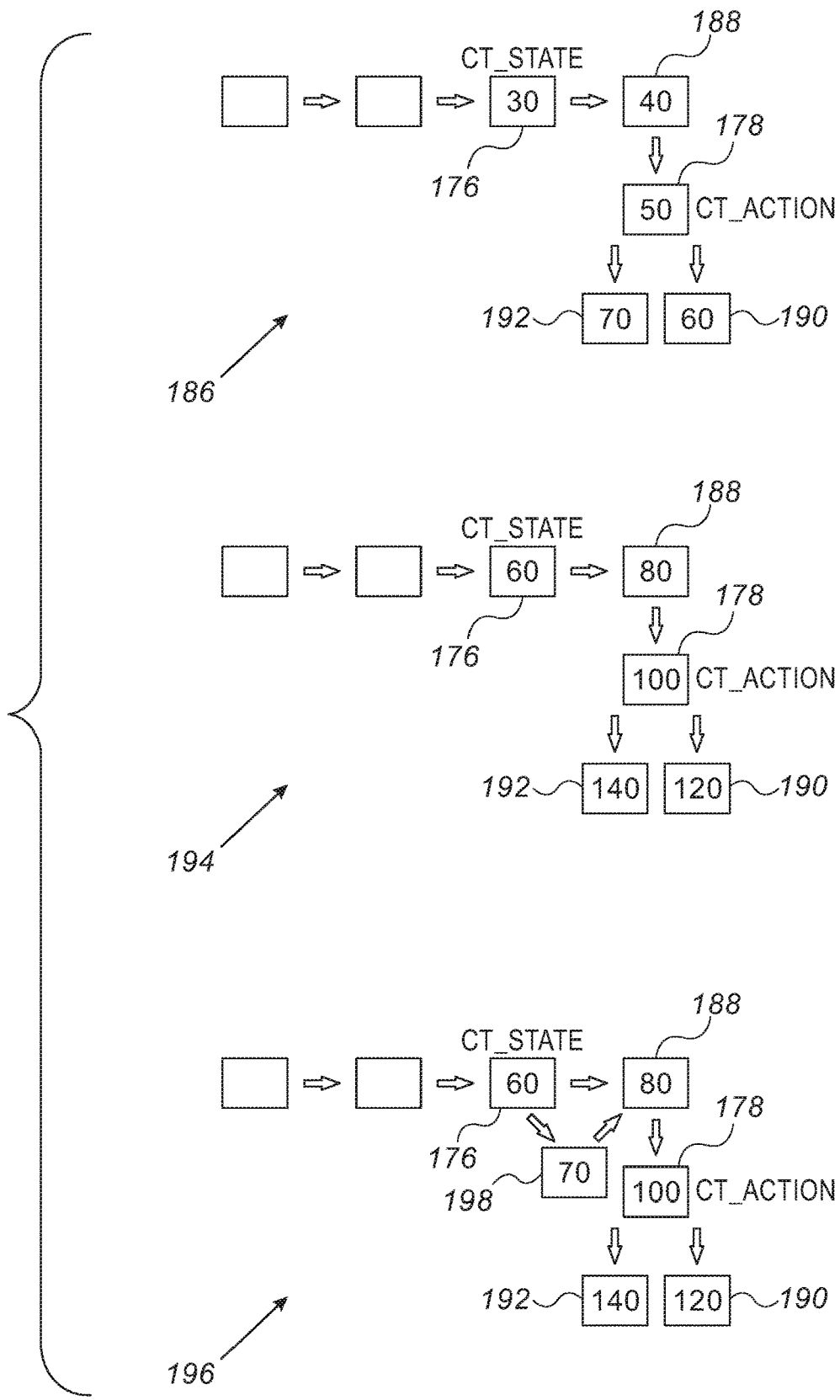
FIG. 8 is a set of diagrams illustrating provision of rules concerning a connection state to an embedded switch in accordance with an embodiment of the invention.
Figure 9:
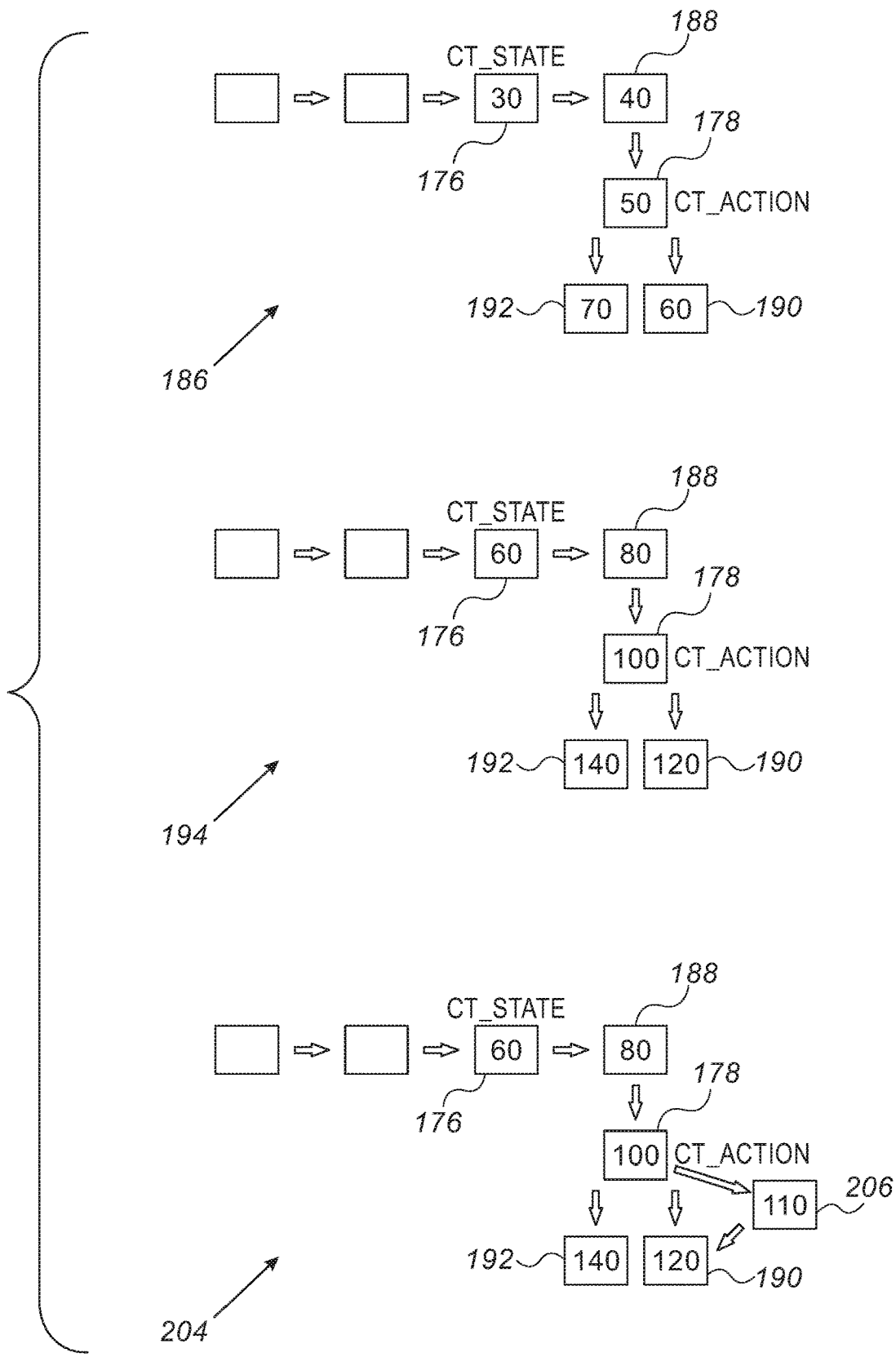
FIG. 9 is a set of diagrams illustrating provision of rules concerning packet processing actions to an embedded switch in accordance with an embodiment of the invention.

Next, at step 174 the software transmits rules for handling the packet to the hardware. It is explained below that existing numerical identifiers in the hardware flow tables are doubled. With reference to FIG. 8 and FIG. 9 a typical rule set could be:

---
Rule 1. Testing the TCP connection state (ct_state)
---
In Flow table 176 (diagram 194, numerical ID 60)
If (Packet matches Criterion M) then
 do at least a portion of the following actions:
  A1: Connection_Tracking (i.e., check TCP connection state)
  A2: . . .
  A3: . . .
  A3: Send packet to some flow table xxx
  Ak (there may be more than the above-listed actions)

---
Rule 2. Processing the packet (ct_action) based on the TCP connection state
---
In Flow table flow table 178 (diagram 194, numerical ID 100)
If (Packet matches Criteria (C and S) then do actions:
  B1: Action1
  B2: Action2
  . . .
  BK: Actionk

---

The connection state (ct_state) and the actions (ct_action) may be determined and executed between any two arbitrary steps, i.e., flow tables, during the handling of a packet. Moreover, the test for ct_action may occur in any flow table during packet processing, not necessarily the flow table immediately following the test for ct_state.

Step 174 comprises steps 180, 182. In step 180 each the numerical identifier of each open flow table in the hardware is multiplied by two. The purpose of this procedure is to accommodate insertion of an intermediate flow table in the hardware between two existing flow tables, together with its set of match-and-action rules.

In step 182 a new intermediate flow table is established in the hardware.

Then in step 184, a set of rules, e.g., Rules 1 and 2 shown above, are converted to a form that is compatible with the hardware flow tables and transmitted to the newly established intermediate flow table. Step 184 may be accomplished using the OpenFlow protocol, promoted by the Open Networking Foundation.

Step 174 is performed somewhat differently for rules involving the connection state (ct_state) and rules involving actions to be taken.

Method 1.

FIG. 8 is a set of diagrams illustrating provision of rules concerning a connection state to an embedded switch in accordance with an embodiment of the invention.

Diagram 186 illustrates a series of flow tables in the hardware prior to beginning step 174. Flow tables 176, 188, 178, 190, 192 are have numerical identifiers 30, 40, 50, 60, 70, respectively.

In diagram 194 the numerical identifiers have been doubled. Flow tables 176, 188, 178, 190, 192 are now numbered 60, 80, 100, 120, 140, respectively.

It will be noted that flow table 176 deals with determination of the connection state. In diagram 196 intermediate flow table 198 has been established between flow tables 176, 188, and has been numbered 70 in order to preserve intervals of the numbering scheme. Although not the case in diagram 196 it has been found to be desirable to double the original numbering scheme to accommodate hardware in which the tables were consecutively numbered (to maintain an increasing order of successive flow tables and at the same time avoid non-integer designations). Maintaining such ordering prevents programming errors and undesired loops that might occur if the numbers were out-of-order.

Rule 1, noted above, is transmitted to the flow tables, using a language that complies with the OpenFlow protocol, such as the open source language P4. Criterion M, mentioned in Rule 1, is transferred to the flow table immediately preceding intermediate flow table 198, i.e., flow table 176, (renumbered 60) along with the action 'goto intermediate flow table'. It will be recalled that intermediate flow table 198 contains a default rule—transfer the packet to the software layer. If criterion M were not satisfied the packet would not move from flow table 60 to the intermediate flow table and no action would be taken. What actually would happen is that another set of criteria, e.g., criteria K, Z or R, would be tested in table 60 and an action taken as specified by those criteria.

Rule 2, dealing with actions (ct_action), is also transferred to the flow tables. Criterion C is transferred to flow table 176. Criterion S, which is a test on the TCP state of the packet, is implemented in embodiments where tag-switched routing is employed. It is evaluated by a test on whether the packet flow tag indicates an established connection. Actions B1 . . . BK are also transferred to the same flow table. Of course, this test would fail in the case of the first packet of a new connection.

Once the software layer detects a new connection, e.g., by an unrecognized 5-tuple, the software continues accepting packets of the flow in step 200. In step 202 software flow-table layer, ct_state has the value 'established'. In this case the software layer offloads the connection. The following rule is inserted into intermediate flow table 198 in step 202:

---

Rule 3:

---

Flow-Table ID: an identifier of an intermediate flow table:
premilimary step: allocate and reset a unique packets counter PACKET-COUNTER
    Match: Connection 5-tuple + Ack flag + original Match M.
    Action (1): Increment unique packet counter PACKET-COUNTER by one (The packet counter is used for connection expiration, which is described below).
        Perform actions A2 . . . AK (rule 1).
        On non-supporting hardware:
            Action (2a): Tag Packet with packet-flow-tag = established.
        On supporting hardware, e.g., as shown in FIG. 5 and FIG. 6:
            Action (2b): Send packet to hardware connection tracking module, e.g., context 78 (FIG. 2), which marks a tag on the packet. Examples of such tags are "invalid", "established", "move to software", and "end-of-connection".

---

Method 2.

This method of performing step 174 (FIG. 7) is shown in FIG. 9, which is a set of diagrams illustrating provision of rules concerning packet processing actions to an embedded switch in accordance with an embodiment of the invention. Diagrams 186, 194 reflect the same sequence as shown in FIG. 8. In diagram 204 intermediate flow table 206 (numbered 110) has been established between flow table 178 (numbered 100) and flow table 190 (numbered 120), immediately following an action (ct_action) in flow table 178.

In steps 200, 202 when the connection (ct_state) is "established", the software offloads the connection to the hardware by entering Rule 1 into flow table 176 (renumbered 60) as noted above, and the following rule:

---

Rule 4. Testing the TCP connection state (ct_state)

---

In Flow table 176 (diagram 194, numerical ID 60)
If (Packet matches Criterion M) then
    do actions:
        A1: Connection_Tracking (i.e., check TCP connection state)
        A2: . . .
        A3: . . .
        A4: Send packet to some flow table xxx
[ . . . ] Ak (there can be more or fewer than 4 rules).

---

Rule 5. Processing the packet (ct_action) based on the TCP connection state

---

In Intermediate flow table 206 (FIG. 9, diagram 204, numerical ID 110)
    If (Packet matches Criteria (C and S) then do actions:
        B1: Action1
        B2: Action2
        . . .
        BK: ActionK

---

Next in steps 200, 202, a flow table preceding the intermediate flow table is copied to the equivalent flow table (40 in this case) with the following changes:

Criterion C is transferred and there is only one action: goto intermediate flow table.

Rule 5 is copied to the intermediate flow table: Criterion C is transferred as is, with criterion S replaced with a match on 5-tuple+ack flag. All existing actions remain as is, and a new action is added 'increment counter'

Once the software layer detects a new connection (by a new 5-tuple) the software continues accepting packets software flow-table layer. At some point an action (ct_action) in software has to be called and if software detects from the metadata on the packet that the state is "established", the software layer offloads the connection in step 202 (FIG. 7) by allocating and resetting a unique packet counter PACKET-COUNTER, and then entering the following rule into the intermediate flow table 206 (FIG. 9)

---

Rule 6.

---

Flow-Table ID: intermediate flow table ID
Match: Connection 5-tuple + Ack flag + original match C from rule.
Action (1 . . . K): Original actions from rule

---

Action (K+1): Increment the packet counter PACKET-COUNTER by one. This packet counter is used for evaluating connection expiration, which is described below Connection Termination.

Figure 10:
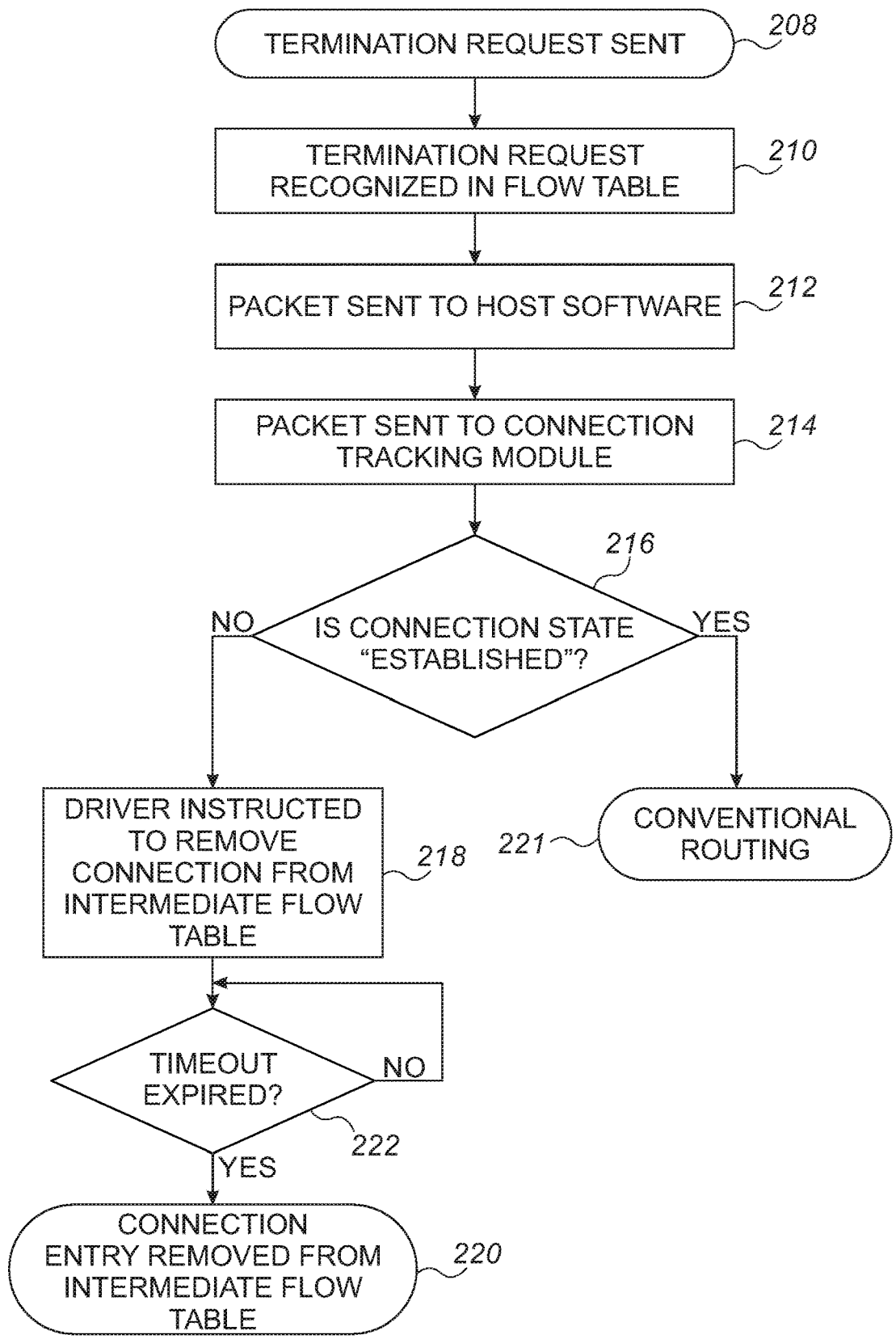
FIG. 10 is a flow chart of a method of connection termination in accordance with an embodiment of the invention.

FIG. 10 is a flow chart of a method of connection termination in accordance with an embodiment of the invention. At initial step 208 either side of a connection sends a packet that includes a termination request (FIN or FIN/ACK). Within the NIC hardware a steering rule recognizes the termination request, in step 210, and transmits the packet to host software, e.g., a software driver running in the kernel in step 212. The host software (driver) also recognizes the termination request, and in step 214 sends the packet to a connection tracking module, e.g., software module 48 (FIG. 2).

Next, at decision step 216, it is determined in the connection tracking module if the connection state still has the value "established". If the determination at decision step 216 is negative, then control proceeds to step 218. The NIC driver is instructed to update the intermediate flow table and remove the connection entry, which occurs in final step 220. When the driver receives a request to stop offloading (with a predetermined timeout), it puts the request in a separate connection list and includes a predetermined timeout. The timeout provides a delay, shown as delay step 222, which is needed in order to allow late-arriving packets, e.g., packets received out-of-order, to reach their destination after the termination request was received.

If the determination at decision step 216 is affirmative, i.e. "established" then at final step 221 the kernel software continues routing the packet conventionally to its destination.

Connection Expiration.

A connection has expired if neither side has sent a packet during a relatively long period of time. The NIC Driver performs an aging test. It periodically reads a counter that is included in the steering rule and compares it to its previously read value to detect if a connection has expired.

The driver maintains two lists for aging:

1. A list of all the offloaded connections in the system—expiration time: (Such times are relatively long, for example 6 hours). This list is so large that it is not practical to read the hardware counter for all entries in such a flow table within a reasonable time. A small part of the list every time completion of a full round within the expiration time.

When the driver has detected that a connection has expired it creates a dummy packet with the RST bit set, and possibly including additional metadata, which indicate that it is not a RST packet sent on the network, and sends it to force termination of the connection at the software layer.

2. A list of terminated connections in the system and their respective expiration times. The driver wakes up every second and examines the items in the list in a round robin fashion.

When their predefined time intervals have elapsed the driver reads the respective hardware counters, and for each case checks if the counter value has changed. If so, the connection remains open for another timeout interval. Otherwise the driver removes the steering rule from the intermediate flow table.

If, prior to the expiration of the timeout interval the driver receives a request with the same 5-tuple for connection tracking, then the driver removes the 5-tuple from the list of terminated connections.

Offloaded Rules.

The following matchable connection states are supported:

±trk. Whether or not the packet has been subjected to connection tracking.

±inv. Whether or not the packet is invalid.

±new. Whether or not the packet is new.

±est. Whether or not the connection is established.

In the case of non-supporting hardware, only +trk and +est rules are offloaded. Non-supporting hardware, which lacks the connection tracking module, cannot detect the ±inv state.

For supporting hardware+trk+est, +trk+est+inv, +trk+inv and +trk-inv rules are offloaded to hardware. No other rules are offloaded and these states are always determined in software.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

The invention claimed is:

1. A method for communication, comprising:

receiving over a network in a network interface controller (NIC) incoming data packets destined for one or more local processes running on a host processor that is coupled to the network by the NIC, wherein the NIC comprises an embedded switch having an ordered series of flow tables;

maintaining a list of active connections established via the NIC between the local processes running on the host processor and corresponding processes on other computers on the network in accordance with a predefined transport protocol;

maintaining context information with respect to a respective state of each of the active connections;

upon receiving in the NIC a packet from the network having a header identifying the packet as having been transmitted to one of the local processes in accordance with the predefined transport protocol, checking the list, by the NIC, to make a determination that the packet fails to correspond to any of the active connections in the list;

responsively to the determination with a connection handling program in the host processor establishing a new connection for the packet, wherein establishing a new connection comprises transmitting packet-handling rules for the new connection from the host processor to the NIC;

instantiating a new flow table in the series of flow tables;

incorporating the packet-handling rules into the new flow table;

transferring contents of the packet to the new flow table; and in the NIC processing subsequently arriving packets that correspond to the new connection in accordance with the packet-handling rules, wherein instantiating a new flow table comprises inserting the new flow table between two contiguous flow tables in the series, wherein the flow tables in the series comprise respective ordered numerical identifiers, and wherein instantiating a new flow table comprises doubling the numerical identifiers, thereafter inserting the new flow table, and assigning a new numerical identifier to the new flow table that is in a range between the doubled numerical identifiers of the two contiguous flow tables.

2. The method according to claim 1, wherein maintaining context information is performed in hardware that supports connection tracking.

3. The method according to claim 1, further comprising in the NIC using the packet-handling rules of the new flow table to distinguish a new connection from an established connection.

4. The method according to claim 1, further comprising performing actions on the packet in the new flow table responsively to a satisfaction of a predetermined criterion.

5. The method according to claim 1, further comprising in the NIC using the packet-handling rules of the new flow table to identify a connection termination request.

6. The method according to claim 5, further comprising transferring, responsively to the connection termination request, flow control of the packet to a software process executing in the host processor.

7. Network interface apparatus, comprising:
a host interface for connection to a host processor;
a network interface, which is configured to receive over a network incoming data packets destined for one or more local processes running on the host processor; and
packet processing circuitry, comprising hardware logic, which is coupled between the network interface and the host interface and is configured to access a list of active connections established between the local processes running on the host processor and corresponding processes on other computers on the network in accordance with a predefined transport protocol,
wherein the packet processing circuitry is configured upon receiving a packet from the network having a header identifying the packet as having been transmitted to a local process in accordance with the predefined transport protocol for:
checking the list, to make a determination that the packet fails to correspond to any of the active connections in the list;
responsively to the determination with a connection handling program in the host processor establishing a new connection for the packet, wherein establishing a new connection comprises transmitting packet-handling rules for the new connection from the host processor to the packet processing circuitry;
updating the list of active connections; and
processing subsequently arriving packets that correspond to the new connection in accordance with the packet-handling rules,
wherein the packet processing circuitry comprises an embedded switch having an ordered series of flow tables, and is further configured for:
instantiating a new flow table in the series;
incorporating the packet-handling rules into the new flow table; and
accepting contents of the packet in the new flow table,
wherein instantiating a new flow table comprises inserting the new flow table between two contiguous flow tables in the series,
wherein the flow tables in the series comprise respective ordered numerical identifiers, and wherein instantiating a new flow table comprises doubling the numerical identifiers, thereafter inserting the new flow table, and assigning a new numerical identifier to the new flow table that is in a range between the doubled numerical identifiers of the two contiguous flow tables.

8. The apparatus according to claim 7, wherein the packet processing circuitry supports connection tracking, and is configured for maintaining context information with respect to a respective state of each of the active connections.

9. The apparatus according to claim 7, wherein the packet processing circuitry is further configured for using the packet-handling rules of the new flow table to distinguish a new connection from an established connection.

10. The apparatus according to claim 7, wherein the packet processing circuitry is further configured for performing actions on the packet in the new flow table responsively to a satisfaction of a predetermined criterion.

11. The apparatus according to claim 7, wherein the packet processing circuitry is further configured for using the packet-handling rules of the new flow table to identify a connection termination request.

12. The apparatus according to claim 11, wherein the packet processing circuitry is configured for transferring, responsively to the connection termination request, flow control of the packet to a software process executing in the host processor.

* * * * *